United States Patent [19]

Yanagawa et al.

[11] Patent Number: 5,291,575
[45] Date of Patent: Mar. 1, 1994

[54] MANUFACTURING METHOD FOR WAVEGUIDE-TYPE OPTICAL COMPONENTS

[75] Inventors: Hisaharu Yanagawa, Tokyo; Ken Ueki, Ichihara, both of Japan

[73] Assignee: The Furukawa Electric Co., Ltd., Tokyo, Japan

[21] Appl. No.: 917,838

[22] Filed: Jul. 21, 1992

[30] Foreign Application Priority Data

Jul. 24, 1991 [JP] Japan .................. 3-184658

[51] Int. Cl.⁵ .............................. G02B 6/10
[52] U.S. Cl. .................. 385/132; 385/142; 65/3.11; 65/3.15; 65/31; 65/60.8
[58] Field of Search ............ 385/132, 142, 144; 65/3.11, 3.15, 31, 60.8

[56] References Cited

U.S. PATENT DOCUMENTS

| | | | |
|---|---|---|---|
| 4,789,642 | 12/1988 | Lorenzo et al. | 437/24 |
| 4,831,628 | 5/1989 | Tsang | 372/46 |
| 5,178,658 | 1/1993 | Tumminelli et al. | 65/30.1 |

OTHER PUBLICATIONS

Optical Channel Waveguide Fabrication Based on Electron Beam Irradiation of Silica by S. J. Madden et al; Applied Physics Letters, vol. 57, No. 27; Dec. 31, 1990; pp. 2902-2903.
Waveguide Fabrication for Integrated Optics by Electron Beam Irradiation of Silicia by D. Barbier et al; Journal of Lightwave Technology, vol. 9, No. 6; Jun. 1991.
Patent Abstracts of Japan, vol. 9, No. 116 (P-357) (1839) & JP-A-60 002 906 (Nippon Denshin Denwa Kosha), Jan. 9, 1985, *Abstract.
Patent Abstracts of Japan, vol. 11, No. 35 (P-542) Feb. 3, 1987 & JP-A-61 204 603 (Hitachi), Sep. 10, 1986, *Abstract.
Patent Abstracts of Japan, vol. 10, No. 202 (P-477) Jul. 15, 1986 & JP-A-61 045 202 (Hitachi), Mar. 3, 1986, *Abstract.

*Primary Examiner*—Frank Gonzalez
*Attorney, Agent, or Firm*—Frishauf, Holtz, Goodman & Woodward

[57] ABSTRACT

A method for manufacturing waveguide-type optical components featuring a lower propagation loss at low cost in which a lower clad section (2) made of silica glass is formed on a substrate (1), and an antistatic layer and a mask layer having a desired pattern are formed on the surface of the lower clad section (2) in the order they are listed. Then, an electron beam is irradiated from above the mask layer to produce a core (6) of the desired pattern in the lower clad section (2), the mask layer and the antistatic layer are removed to expose the surface of the lower clad section (2), and an upper clad section (7) having a lower refractive index than the core (6) is formed on the exposed surface of the lower clad section (2), thus producing an optical component. The surface of the whole optical component is at a distance from the core; therefore, the scattering loss caused by minute irregularities on the surface of the optical component is reduced.

19 Claims, 2 Drawing Sheets

MANUFACTURING METHOD FOR WAVEGUIDE-TYPE OPTICAL COMPONENTS

BACKGROUND OF THE INVENTION

The present invention relates to a manufacturing method for waveguide-type optical components, and more particularly, to a method for manufacturing waveguide-type optical components with a lower propagation loss at a low cost.

To fabricate optical fiber communication systems for an extensive field of applications, it is necessary to supply, in a high volume at a low cost, optical components such as optical couplers/splitters and optical multiplexers/demultiplexers to be incorporated in the systems. There is especially high demand for high-volume and low-cost supply of the waveguide-type optical components, which use silica glass as the main material, because they ensure good coupling with optical fibers and provide excellent optical propagation. The electron beam irradiation is attracting attention in the industry as a method for manufacturing waveguide-type optical components, which is capable of responding to the demand described above and which requires a relatively low man-hour and a lower cost. Concerning the optical component manufacturing method based on the electron beam irradiation, for instance, a thesis titled "Optical channel waveguide fabrication based on electron beam irradiation of silica" by S. J. Madden et al. appeared in Applied Physics Letters, Vol. 57, No. 27 issued on Dec. 31, 1990, and another thesis titled "Waveguide Fabrication for Integrated Optics by Electron Beam Irradiation of Silica" by D. Barbier et al. appeared in Journal of Lightwave Technology, vol. 9, No. 6 issued in June 1991.

According to the conventional typical electron beam irradiation method, an antistatic layer composed of aluminum, for example, and a thin-film layer composed of gold, for example, are formed in turn on a lower clad section which is formed on a Si substrate and which is made of silica glass. Then, only a portion of the thin-film layer, which corresponds to a waveguide pattern, is removed from the thin-film layer to form a mask layer of the desired pattern, and an electron beam is irradiated from above the mask layer. In that portion of the lower clad section which is subjected to the electron beam irradiation, the silica glass contracts and produces a higher refractive index than the other portions, thereby forming a core. Lastly, the mask layer and the antistatic layer are removed in turn. In this manner, waveguide-type optical components, in which cores with the desired patterns in the lower clad assemblies exist as the waveguide routes, can be obtained at a relatively low cost.

However, as is generally known about the film forming technology, the surface of the lower clad section does not become completely smooth and flat, but develops minute irregularities. As a result, in an optical component manufactured in such a manner, the top surface of a core formed in the lower clad section is in contact with the foregoing minute irregularities of the lower clad section, and then the top surface of the core is exposed to the atmosphere. Under such a condition, the light, which goes through the core, increases its scattering loss due to the foregoing minute irregularities. Consequently, the propagation loss, which is partly caused by the scattering loss, increases.

OBJECT AND SUMMARY OF THE INVENTION

An object of the present invention is to provide a manufacturing method for waveguide-type optical components with a reduced propagation loss, which manufacturing method has been achieved by solving the above-mentioned problem in the waveguide-type optical components manufactured using the electron beam irradiation and by increasing the distance between the core and the uneven surface of the optical component.

The manufacturing method for waveguide-type optical components according to the present invention comprises a process wherein a lower clad section made of silica glass is formed on a substrate; an antistatic layer and a mask layer having the desired pattern are formed in the order listed on the surface of the lower clad section; a core of the foregoing desired pattern is formed in the lower clad section by irradiating electronic beams from above the mask layer; the mask layer and the antistatic layer are removed to expose the surface of the lower clad section; and an upper clad section having a lower refractive index than the core is formed on the exposed surface of the lower clad section.

The method in accordance with the present invention is advantageous in that it makes it possible to manufacture optical components in which the cores of the optical components are embedded in the upper clad sections so that they are apart from the surfaces of the whole optical components (the surfaces of the upper clad sections); therefore, the scattering loss due to minute irregularities on the whole surface of an optical component can be reduced, resulting in a reduced propagation loss which is partly caused by scattering loss. Additionally, according to the method of the present invention electron beam irradiation is used to manufacture optical components, making it possible to reduce the required manufacturing man-hours and cost.

DETAILED DESCRIPTION

The manufacturing method for waveguide-type optical components according to the present invention will now be described with reference to the accompanying drawings of FIG. 1 through FIG. 6.

Figure 1:
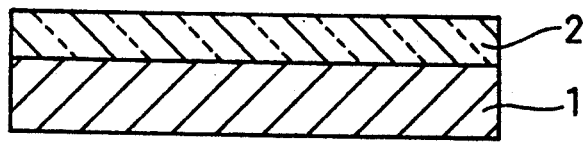
FIG. 1 is a schematic sectional view which shows a lower clad section formed on a substrate in a manufacturing process of a waveguide-type optical component in accordance with the method of the present invention.
Figure 2:
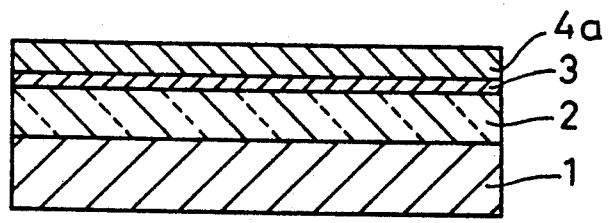
FIG. 2 is a schematic sectional view which shows an antistatic layer and a metallic thin-film layer formed on the lower clad section in the process.
Figure 3:
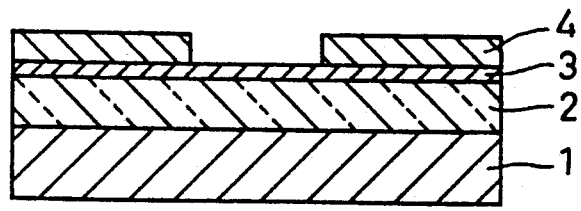
FIG. 3 is a schematic sectional view which shows a mask layer formed in the process.

As shown in FIG. 1, a lower clad section 2 made of silica glass is formed to a thickness of about 10 to 30 μm on a silicon substrate 1 by such methods as the flame hydrolysis deposition method, the plasma enhanced CVD method, the sol-gel method, and the electron beam evaporation method. Then, as shown in FIG. 2, an antistatic layer 3, which is made of, for example, metallic aluminum and measures about 300 angstrom thick, and a thin-film layer 4a, which is made of, for example, gold and measures about 6000 angstrom thick are formed on a lower clad section 2 in sequence by, for instance, the sputtering method or the evaporation method. After that, only a portion of the thin-film layer 4a that corresponds to a waveguide route pattern to be formed is removed from the thin-film layer 4a by applying, for example, the photo-lithography and the reactive ion etching (RIE) to the thin-film layer 4a in turn to produce a mask layer 4 of the desired pattern (FIG. 3).

Figure 4:
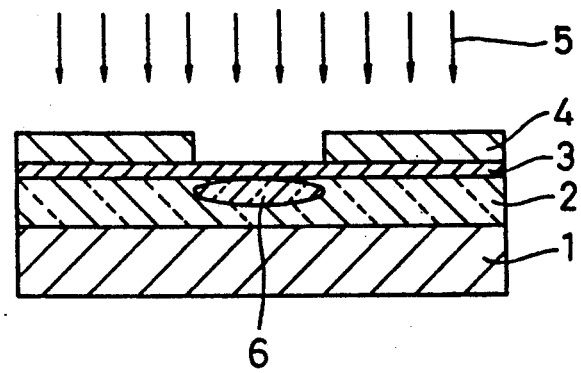
FIG. 4 is a schematic sectional view which shows a core formed by irradiating an electron beam in the process.

Next, as shown in FIG. 4, an electron beam 5 is irradiated from above the mask layer 4. Normally, the accelerating voltage of electron beams ranges from 15 to 25 kV with a dose of about 1 to 2 C/cm$^2$. In that portion of the lower clad section 2 which is subjected to the irradiation of the electron beam, the silica glass contracts and develops a higher refractive index than other portions. In other words, this portion with the higher refractive index provides a core 6, thereby forming the core 6 of the desired pattern in the lower clad section 2. The thickness of the core 6 can be set to an appropriate value by adjusting the accelerating voltage of the electron beam irradiated. Also, a difference in specific refractive index between the core 6 and the lower clad section 2 can be set to any value by adjusting the dose of the electron beam. For instance, when the electron beam is irradiated under the above-mentioned condition, the core 6 will be 2 to 7 μm high, the core layer having a difference in specific refractive index of about 0.35%. Then, the mask layer 4 and the antistatic layer 3 are removed in sequence (FIG. 5).

Figure 5:
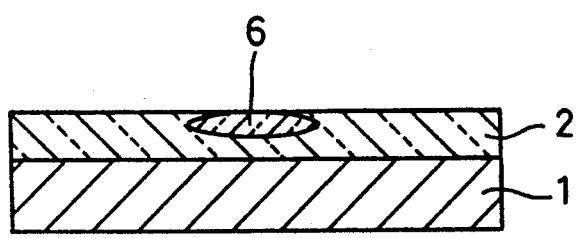
FIG. 5 is a schematic sectional view which shows the state wherein mask layer and the antistatic layer have been removed in the process.

As in the case where optical components are manufactured by the conventional method, the optical components manufactured by the method in accordance with the present invention has a large propagation loss in the manufacturing phase shown in FIG. 5 wherein the mask layer 4 and the antistatic layer 3 are removed after the core 6 is formed. This means that the surface of the lower clad section 2 formed on the silicon substrate 1 as shown in FIG. 1 does not become completely smooth and flat, but develops minute irregularities. Therefore, in the manufacturing phase shown in FIG. 5, the top surface of the core 6 formed in the lower clad section 2 is in contact with the foregoing minute irregularities of the lower clad section 2, and then, the top surface of the core 6 is exposed to the atmosphere. Under such a condition, the light, which goes through the core 6, increases its scattering loss due to the foregoing minute irregularities. Consequently, the propagation loss, which is partly caused by scattering loss, increases.

Figure 6:
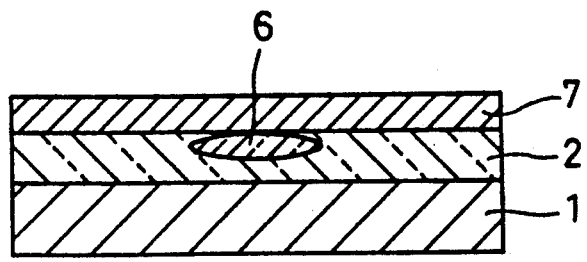
FIG. 6 is a schematic sectional view which shows an upper clad section formed in the process.

To solve the problem, in the method according to the present invention, an upper clad section 7 is provided on the lower clad section 2 to embed the core 6 in the clad sections 2 and 7 as shown in FIG. 6, this process being added to the processes shown in FIG. 1 through FIG. 5. In an optical component as a completed product shown in FIG. 6, the surface of the upper clad section 7 has minute irregularities, but the core 6 is not exposed to the atmosphere. Further, the core 6 is apart from the foregoing minute irregularities by the thickness of the upper clad section 7; therefore, light going through the core 6 incurs a lower scattering loss caused by the minute irregularities.

There is no particular limit to the thickness of the upper clad section 7, however, the above-mentioned effect can be maintained more easily in general as the thickness increases. For instance, in the case of a waveguide-type optical component designed to optimize the loss of field mismatch with a regular optical fiber for a wavelength of 1.3 μm, even if the upper clad section 7 is about 0.1 μm thick, it starts to contribute to reduction in the scattering loss, and when the thickness reaches 20 μm or more, the effect will be attained almost completely.

The material used for the upper clad section 7 is acceptable as long as it has a lower refractive index than the core. As in the case of the lower clad section 2, the upper clad section 7 can be formed by a method such as the flame hydrolysis deposition method, the plasma enhanced CVD method, the sol-gel method, and the electron beam evaporation method. The flame hydrolysis deposition method is especially suitable. For instance, when the flame hydrolysis deposition method is used to form the upper clad section 7 using the same silica glass as the lower clad section 2, a waveguide-type optical component with an extremely low loss can be obtained.

EMBODIMENT

The lower clad section 2 consisting of silica glass of about 25 μm thick was formed on the Si substrate 1 by the flame hydrolysis deposition method (FIG. 1). Then, the aluminum layer (antistatic layer) 3 of about 300 angstrom thick and the gold thin layer 4a of about 6000 angstrom thick were formed on the lower clad section 2 in turn by the sputtering method (FIG. 2). The gold thin layer 4a was subjected to the photo-lithography and the reactive ion etching to turn the gold thin layer 4a into the mask layer 4 having a pattern wherein the waveguide route width is about 8 μm (FIG. 3).

Then, the electron beam 5 was irradiated from above the mask layer 4 under an accelerating voltage of 25 kV. The dose was about 1 C/cm$^2$. The core 6, which had a height of about 5 μm, a width of about 8 μm, and a difference in specific refractive index of about 0.35%, was formed (FIG. 4). Next, the mask layer 4 and the aluminum layer 3 were removed in sequence to expose the lower clad section 2 (FIG. 5). The light propagation loss under this condition was 0.3 dB/cm.

On the exposed lower clad section 2, the upper clad section 7, which consists of the same silica glass as the lower clad section and which is about 20 μm thick, was formed by the flame hydrolysis deposition method, thus embedding the core 6.

The propagation loss of the optical component thus obtained was 0.1 dB/cm.

What is claimed is:

1. A manufacturing method for waveguide-type optical components, comprising:
   (a) forming a lower clad section, which is made of silica glass, on a substrate;
   (b) forming an antistatic layer and a mask layer, which has a desired pattern, on the surface of said lower clad section in the order listed;
   (c) forming a core of said desired pattern in said lower clad section by irradiating an electron beam from above said mask layer toward said lower clad section;
   (d) removing said mask layer and said antistatic layer, after said core is formed, to expose the surface of said lower clad section; and
   (e) forming an upper clad section, which has a lower refractive index than said core, on the exposed surface of said lower clad section and over said core, said upper clad section having a thickness of at least 0.1 μm to reduce scattering loss caused by minute irregularities produced on a surface of said upper clad section.

2. The manufacturing method for waveguide-type optical components according to claim 1, wherein said upper clad section is formed by a flame hydrolysis deposition method.

3. The manufacturing method for waveguide-type optical components according to claim 1, comprising forming said upper clad section to have a thickness of at least 20 μm.

4. The manufacturing method for waveguide-type optical components according to claim 1, wherein said antistatic layer is an aluminum layer.

5. The manufacturing method for waveguide-type optical components according to claim 4, wherein said mask layer is a thin gold layer.

6. The manufacturing method for waveguide-type optical components according to claim 1, wherein said mask layer is a thin gold layer.

7. The manufacturing method for waveguide-type optical components according to claim 1, wherein said mask layer is a metallic thin-film layer.

8. The manufacturing method for waveguide-type optical components according to claim 1, wherein said upper clad section is made of silica glass.

9. The manufacturing method for waveguide-type optical components according to claim 1, wherein said removing step comprises removing said mask layer and said antistatic layer in sequence, said mask layer being removed first.

10. A manufacturing method for waveguide-type optical components, comprising:
   (a) forming a lower clad section, which is made of silica glass, on a substrate;
   (b) forming an antistatic layer and a mask layer, which has a desired pattern, on the surface of said lower clad section in the order listed;
   (c) forming a core of said desired pattern in said lower clad section by irradiating an electron beam from above said mask layer toward said lower clad section;
   (d) removing said mask layer and said antistatic layer, after said core is formed, to expose the surface of said lower clad section; and
   (e) forming an upper clad section, which has a lower refractive index than said core, on the exposed surface of said lower clad section; and
   wherein said upper clad section is formed to have a thickness which is sufficient to substantially reduce scattering loss caused by minute irregularities produced on a surface of said upper clad section.

11. The manufacturing method for waveguide-type optical components according to claim 10, wherein said upper clad section is formed by a flame hydrolysis deposition method.

12. The manufacturing method for waveguide-type optical components according to claim 10, comprising forming said upper clad section to have a thickness of at least 0.1 μm.

13. The manufacturing method for waveguide-type optical components according to claim 10, comprising forming said upper clad section to have a thickness of at least 20 μm.

14. The manufacturing method for waveguide-type optical components according to claim 10, wherein said antistatic layer is an aluminum layer.

15. The manufacturing method for waveguide-type optical components according to claim 14, wherein said mask layer is a thin gold layer.

16. The manufacturing method for waveguide-type optical components according to claim 10, wherein said mask layer is a thin gold layer.

17. The manufacturing method for waveguide-type optical components according to claim 10, wherein said mask layer is a metallic thin-film layer.

18. The manufacturing method for waveguide-type optical components according to claim 10, wherein said upper clad section is made of silica glass.

19. The manufacturing method for waveguide-type optical components according to claim 10, wherein said removing step comprises removing said mask layer and said antistatic layer in sequence, said mask layer being removed first.

* * * * *